US006863753B1

(12) United States Patent
Murooka et al.

(10) Patent No.: US 6,863,753 B1
(45) Date of Patent: Mar. 8, 2005

(54) APPARATUS FOR MANUFACTURING FLAT CABLE AND METHOD FOR MANUFACTURING THE SAME

(75) Inventors: Takao Murooka, Tochigi (JP); Hakuji Kobayashi, Tochigi (JP); Masakazu Endo, Tochigi (JP); Toshihiro Tsutsumi, Tochigi (JP); Hiroaki Shirai, Tochigi (JP); Hidehiro Numao, Tochigi (JP)

(73) Assignee: Sony Chemicals Corporation (JP)

( * ) Notice: Subject to any disclaimer, the term of this patent is extended or adjusted under 35 U.S.C. 154(b) by 0 days.

(21) Appl. No.: 09/647,321

(22) PCT Filed: Jan. 20, 2000

(86) PCT No.: PCT/JP00/00262

§ 371 (c)(1),
(2), (4) Date: Nov. 2, 2001

(87) PCT Pub. No.: WO00/45396

PCT Pub. Date: Aug. 3, 2000

(30) Foreign Application Priority Data

Jan. 29, 1999 (JP) .......................................... 11-022937

(51) Int. Cl.$^{7}$ ............................................... B32B 31/00

(52) U.S. Cl. ......................... 156/64; 156/351; 156/360; 156/361

(58) Field of Search .............................. 156/47, 48, 49, 156/50, 51, 52, 53, 54, 55, 56, 64, 350, 351, 352, 353, 354, 355, 356, 357, 358, 359, 360, 361, 362, 363, 364, 365, 366, 367, 368, 378, 379; 174/117 F

(56) References Cited

U.S. PATENT DOCUMENTS

| | | | | |
|---|---|---|---|---|
| 4,357,750 A | * 11/1982 | Ostman | ....................... | 29/847 |
| 5,518,570 A | * 5/1996 | Takagi et al. | ............... | 156/303 |
| 6,032,713 A | * 3/2000 | Ishibuchi et al. | ........... | 156/361 |

FOREIGN PATENT DOCUMENTS

| | | |
|---|---|---|
| JP | 2-312111 | 12/1990 |
| JP | 5-290652 | 10/1993 |
| JP | 9-22626 | 1/1997 |
| JP | 9-282954 | 10/1997 |

* cited by examiner

*Primary Examiner*—Richard Crispino
*Assistant Examiner*—George R. Koch, III
(74) *Attorney, Agent, or Firm*—Rader, Fishman & Grauer PLLC

(57) ABSTRACT

In a manufacturing apparatus for flat cable adapted for allowing plural conductive wires arranged on the same plane to be put between a first insulating tape on which first peeling sheets are stuck at predetermined intervals and a second insulating tape on which second peeling sheets are stuck at predetermined intervals to stick the first insulating tape, the conductive wires and the second insulating tape in order recited, such an approach is employed to respectively adjust tensions applied to the first and second insulating tapes to thereby respectively independently change expansions/contractions of the first and second insulating tapes. Thus, it is possible to correct sticking errors of the first peeling sheets and the second peeling sheets.

9 Claims, 8 Drawing Sheets

APPARATUS FOR MANUFACTURING FLAT CABLE AND METHOD FOR MANUFACTURING THE SAME

TECHNICAL FIELD

This invention relates to an apparatus for manufacturing flat cable and a method for manufacturing the same used for internal wiring, etc. of electronic equipments or automotive vehicles.

BACKGROUND ART

Flat cables are of structure in which plural conductive wires arranged on the same plane are put between two insulating tapes. Since such flat cables are flat and have bending ability, there are merits that it is easy to carry out wiring work and/or wiring can be made also at narrow portion, etc. For this reason, flat cables are widely used for internal wiring, etc. of various home electric products (equipments), communication equipments, word processors, computers and automotive vehicles.

Meanwhile, in manufacturing such flat cable, there is used a manufacturing apparatus as shown in FIG. 1, for example. In this manufacturing apparatus, plural conductive wires 1 arranged in parallel on the same plane are put between first insulating tape 2 and second insulating tape 3 while drawing them into portion between a pair of heating rolls 4 along with the first and second insulating tapes to heat and pressure-fit the first and second insulating tapes 2 and 3 by the pair of beating rolls 4.

At the first and second insulating tapes 2 and 3, adhesive or bonding layers are respectively formed on principal surfaces of the sides opposite to each other. Further, in this manufacturing apparatus, prior to delivering or sending the first and second insulating tapes 2 and 3 into the portion between the pair of heating rolls 4, first peeling or separation sheets 5 are continuously stuck with a predetermined sticking interval A on the adhesive layers of the first insulating tape 2 and second peeling sheets 6 are continuously stuck with a predetermined sticking interval B on the adhesive layers of the second insulating tape 3. When the first and second insulating tapes 2 and 3 are passed through a pair of heating rolls 4 so that they are pressure-fitted, the first and second peeling sheets 5 and 6 are opposed to each other.

Moreover, the first and second peeling sheets 5 and 6 are stuck in a manner respectively perpendicular to length direction of the first and second insulating tapes 2 and 3, and are stuck so that portions are respectively protruded from one ends in the width direction of the first and second insulating tapes 2 and 3.

In addition, in this manufacturing apparatus, cut portions are respectively formed along the outer shapes of the first peeling sheet 5 and the second peeling sheet 6 by means of press cutter (not shown) at the first and second insulating tapes 2 and 3. Thus, after the first and second insulating tapes 2 and 3 are heated and pressure-fitted, respective portions of the first and second insulating tapes 2 and 3 can be peeled off together with the first and second peeling sheets 5 and 6.

Accordingly, the conductive wires 1 are exposed towards the external from peeled off portions of the first and second insulating tapes 2 and 3. Further, the conductive wires 1 are cut off at the exposed portions. There is thus manufactured flat cable in which plural conductive wires 1 are coated with the first and second insulating tapes 2 and 3 and the conductive wires 1 are exposed from the both end portions.

Meanwhile, in manufacturing such flat cable, as shown in FIG. 2, it is required that first peeling sheet 5 stuck (attached) on the first insulating tape 2 and the second peeling sheet 6 stuck (attached) on the second insulating tape 3 are precisely opposite to each other when they are passed through the portion between a pair of heating rolls 4.

For this reason, in the manufacturing apparatus, as shown in FIG. 1, first tape roll **7*a* for supplying first insulating tape 2 and second tape roll 7*b* for supplying the second insulating tape 3 are disposed at positions respectively equal in distance from the pair of heating rolls 4. In addition, in this manufacturing apparatus, first sticking machine 8*a* for sticking first peeling sheets 5 and second sticking machine 8*b* for sticking second peeling sheets 6 are disposed at positions respectively equal in distance from the pair of heating rolls 4, and timings for sticking these first and second peeling sheets 5 and 6** are synchronized.

However, in such conventional manufacturing apparatus, e.g., in such cases of intermittent sending out for sending out in succession first and second insulating tapes 2 and 3, tensions applied to the first and second insulating tapes 2 and 3 are slightly changed (fluctuated) at the time of start of sending out or at the time of stop. For this reason, in the conventional manufacturing apparatus, there were instances where, as shown in FIG. 3, expansions/contractions of the first and second insulating tapes 2 and 3 change, whereby the first and second peeling sheets 5 and 6 are not precisely opposed to each other so that positional shift may take place.

Further, in the conventional manufacturing apparatus, when the first insulating tape 2 and the second insulating tape 3 are heated and pressure-fitted by a pair of heating rolls 4, adhesive layers formed on the first and second insulating tape 2 and 3 are thermally contracted. For this reason, in the conventional manufacturing apparatus, there might take place error in length of sticking (attachment) interval A of first peeling sheets 5 disposed with a predetermined interval and sticking (attachment) interval B of second peeling sheets 6 disposed with a predetermined interval.

As stated above, in the conventional manufacturing apparatuses, it was difficult to precisely oppose the first peeling sheet 5 and the second peeling sheet 6 for various causes. For this reason, with the conventional manufacturing apparatuses, there was the problem that it is difficult to manufacture high quality flat cables.

In addition, in the conventional manufacturing apparatus, in the case where such sticking (attachment) error takes place in the first and second peeling sheets 5 and 6, it was necessary for correcting such sticking error to once stop the apparatus and adjust it. However, the fact that the apparatus is allowed to be stopped results in cause to lower productivity to much degree.

DISCLOSURE OF THE INVENTION

This invention has been proposed in view of conventional circumstances as described above, and its object is to provide a manufacturing apparatus and a manufacturing method for flat cable adapted for manufacturing high quality flat cables and having greatly improved productivity.

The manufacturing apparatus for flat cable according to this invention which aims at attaining such object is directed to a manufacturing apparatus for flat cable in which plural conductive wires arranged on the same plane are put between a first insulating tape on which first peeling sheets are stuck at predetermined intervals and a second insulating tape on which second peeling sheets are stuck at predetermined intervals to stick the first insulating tape, the conductive wires and the second insulating tape in order recited, the apparatus comprising first tension applying means and second tension applying means for respectively applying predetermined tensions to the first insulating tape and the second insulating tape, detecting means for detecting passing of the first peeling sheet and the second peeling sheet after the first insulating tape and the second insulating tape put the conductive wires therebetween, and control means for calculating sticking errors of the first peeling sheets and the second peeling sheets on the basis of detection results that the detecting means has detected, and for controlling the first tension applying means and the second tension applying means on the basis of the sticking errors, wherein the control means controls the first tension applying means and the second tension applying means to thereby respectively adjust tensions of the first insulating tape and the second insulating tape.

In this manufacturing apparatus for flat cable, since the first tension applying means and the second tension applying means respectively adjust tensions of the first insulating tape and the second insulating tape, expansions/contractions of the first insulating tape and the second insulating tape can be respectively independently changed. Further, since the control means controls the first tension applying means and the second tension applying means on the basis of sticking errors of the first peeling sheet and the second peeling sheet detected by detecting means, sticking intervals of the first peeling sheets and the second peeling sheets can be caused to undergo feedback control.

The manufacturing method for flat cable according to this invention which aims at attaining the above-mentioned object is directed to a manufacturing method for flat cable in which plural conductive wires arranged on the same plane are put between a first insulating tape on which first peeling sheets are stuck at predetermined intervals and a second insulating tape on which second peeling sheets are stuck at predetermined intervals to stick the first insulating tape, the conductive wires and the second insulating tape in order recited, wherein the conductive wires are caused to be put between the first insulating tape and the second insulating tape thereafter to detect passing of the first peeling sheet and the second peeling sheet to calculate sticking errors of the first peeling sheets and second peeling sheets on the basis of the detection results to respectively adjust tensions applied to the first insulating tape and the second insulating tape on the basis of this sticking errors.

In this manufacturing method for flat cable, tensions applied to the first insulating tape and the second insulating tape are respectively adjusted, thereby making it possible to respectively independently change expansions/contractions of the first insulating tape and the second insulating tape. In addition, tensions applied to the first insulating tape and the second insulating tape are respectively adjusted on the basis of the detected sticking errors of the first peeling sheets and the second peeling sheets, thereby making it possible to correct sticking errors of the first peeling sheets and the second peeling sheets.

BEST MODES FOR CARRYING OUT THE INVENTION

Best Modes for carrying out this invention will now be described in detail with reference to the attached drawings.

Figure 1:
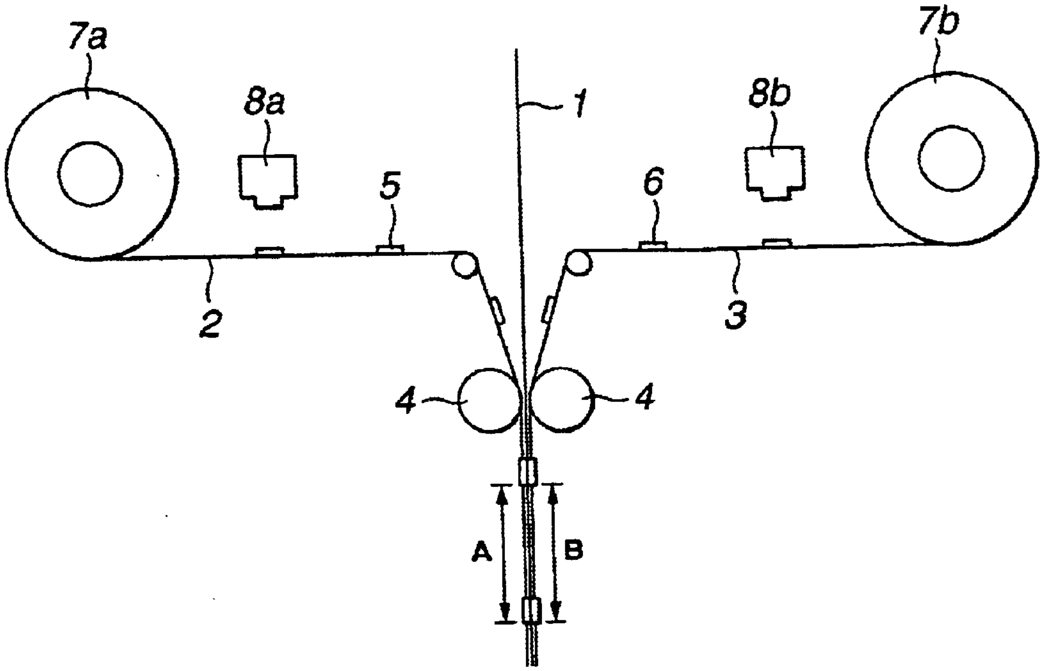
FIG.1 PRIOR ART
FIG. 1 is a schematic view for explaining the configuration of conventional manufacturing apparatus for flat cable.
Figure 2:
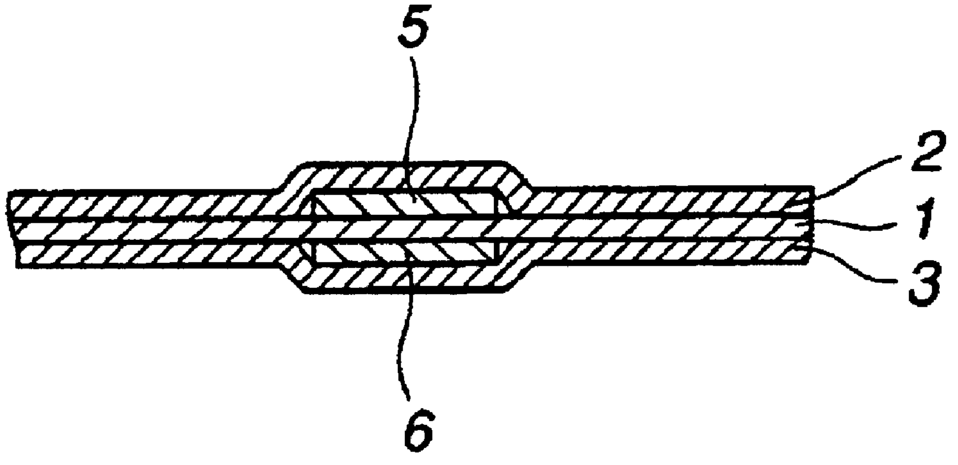
FIG. 2 is a view showing the state where first peeling sheet and second peeling sheet are opposite to each other.
Figure 3:
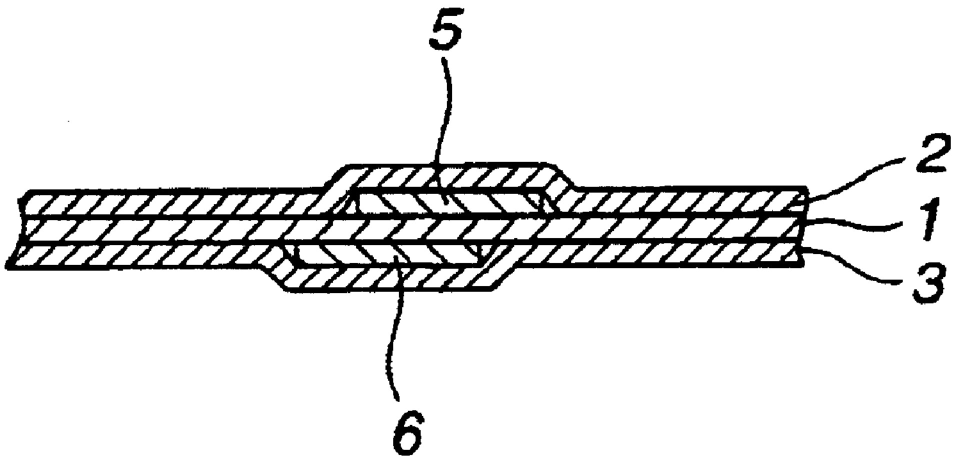
FIG. 3 is a view showing the state where the first peeling sheet and second peeling sheet are caused to undergo positional shift.
Figure 4:
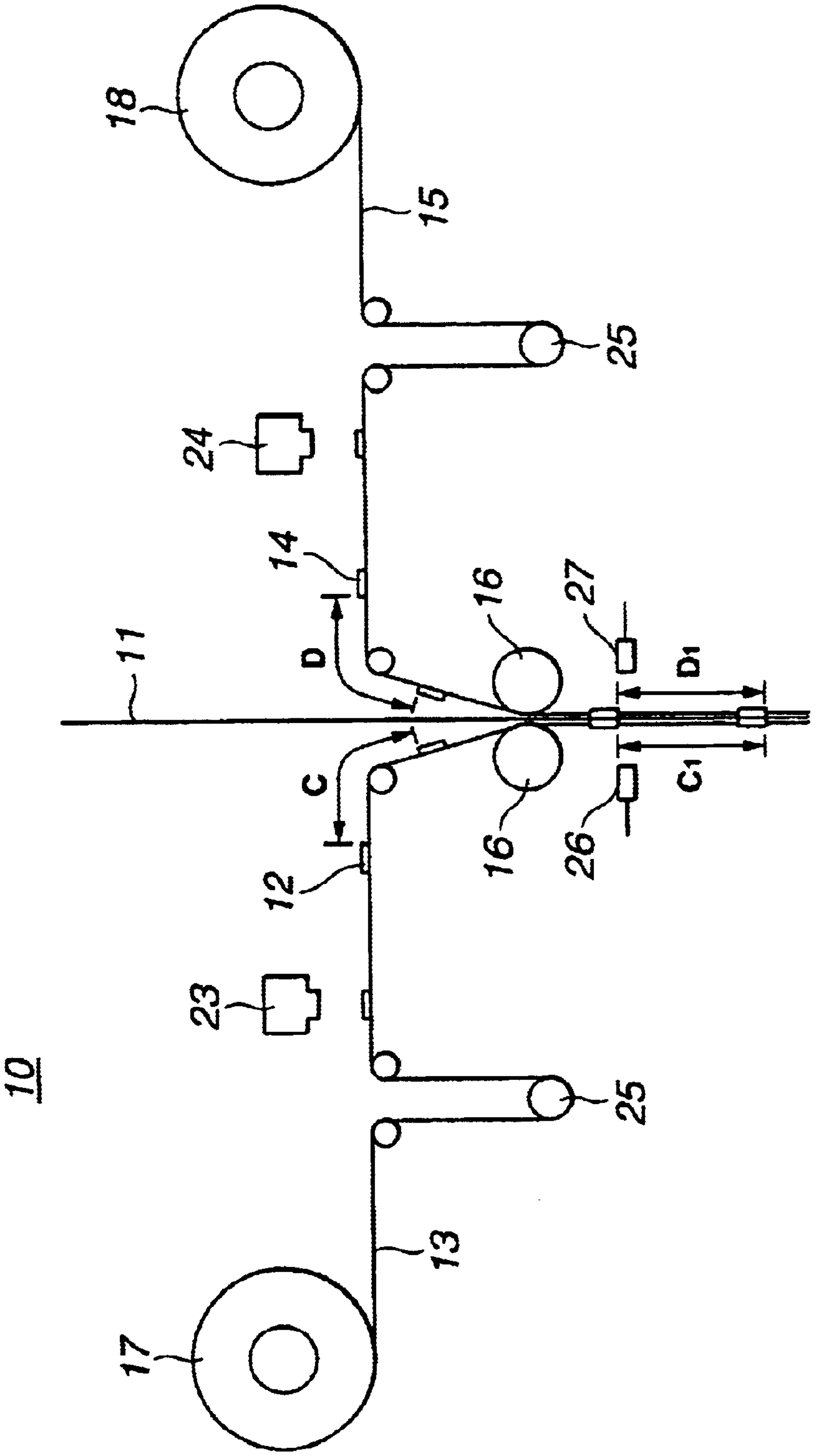
FIG. 4 is a schematic view for explaining the configuration of a manufacturing apparatus for flat cable to which this invention is applied.

An example of a manufacturing apparatus for flat cable (hereinafter simply referred to as manufacturing apparatus) to which this invention is applied is shown in FIG. 4.

In the manufacturing apparatus 10 shown in FIG. 4, plural conductive wires 11 arranged in parallel on the same plane are caused to be put between a first insulating tape 13 and a second insulating tape 15 while drawing such conductive wires into portion between a pair of heating rolls 16 along with the first insulating tape 13 on which first peeling or separation sheets 12 are stuck at predetermined intervals and the second insulating tape 15 on which second peeling sheets 14 are stuck at predetermined intervals to heat and pressure-fit the first insulating tape 13 and the second insulating tape 15 by the pair of heating rolls 16.

As the conductive wire 11, there may be used substantially tape shaped metallic material, such as, for example, copper, aluminum, nickel, stainless steel, etc. In addition, as conductive wire 11, there may be used copper wire where plating such as tin, nickel aluminum, solder, etc. is implemented on its surface. In this example, plural conductive wires 11 are delivered from supply reels (not shown) in the state where they are disposed substantially in parallel to each other at predetermined intervals.

As the first insulating tape 13 and the second insulating tape 15, there may be used resin material having insulating property, e.g., polyethylene terephthalate, polyethylene naphthalate, polyimide, polycarbonate, polyphenylene sulphide, vinyl chloride, etc., and paper or the like, wherein such material has width greater than width of plural conductive wires 11 disposed substantially in parallel.

Moreover, adhesive or bonding layers are respectively formed on one principal surfaces of the first insulating tape 13 and the second insulating tape 15. This adhesive layer consists of adhesive agent, e.g., polyester system resin, epoxy system resin, nylon system resin or acrylic system resin, etc. Such adhesive layer may be formed by a method in which adhesive agents molded so as to have film shape in advance are disposed on the first insulating tape 13 and the second insulating tape 15, or a method in which adhesive agents in the state of low viscosity are coated on the surfaces of the first insulating tape 13 and the second insulating tape 15 to mold them so as to have thin film shape.

Figure 5:
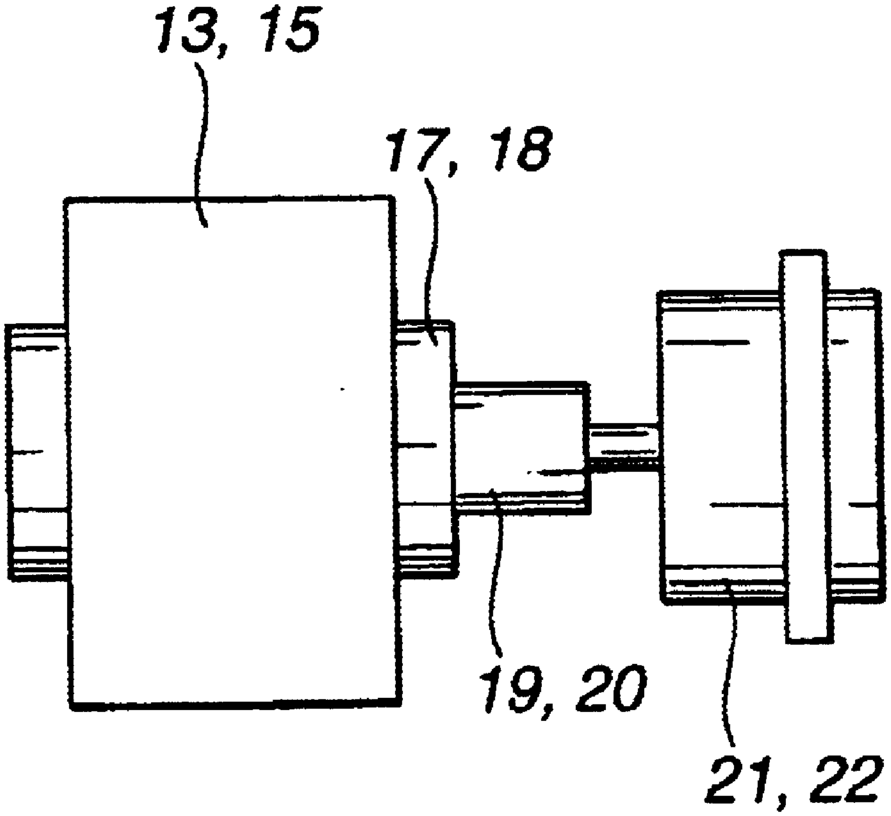
FIG. 5 is a schematic view for explaining the configuration of brake unit provided at the manufacturing apparatus for flat cable to which this invention is applied.

The first insulating tape 13 and the second insulating tape 15 are respectively wound on a first tape roll 17 and a second tape roll 18. The first tape roll 17 and the second tape roll 18 are respectively supported, as shown in FIG. 5, by a first rotational shaft 19 and a second rotational shaft 20. In addition, a first brake unit 21 and a second brake unit 22 are respectively provided at the first rotational shaft 19 and the second rotational shaft 20.

The first peeling sheets 12 and the second peeling sheets 14 are respectively stuck, as shown in FIG. 4, by a first sticking machine 23 and a second sticking machine employed sheet materials which have no compatibility with the above-described adhesive agents. For example, arbitrary material such as paper, metallic foil or resion material, etc. may be used.

A pair of heating rolls 16 exhibit substantially columnar shape, wherein the widths thereof are caused to be slightly greater than widths of the first insulating tape 13 and the second insulating tape 15, and heaters are respectively disposed therewithin.

In this manufacturing apparatus 10, there is employed a configuration such that surfaces where adhesive layers are formed of the first insulating tape 13 and the second insulating tape 15 are oppositely disposed to each other through plural conductive wires 11 disposed substantially in parallel on the same plane. Further, in the manufacturing apparatus 10, the first tape roll 17 and the second tape roll 18 are disposed at positions equal in distance from the pair of heating rolls 16. Namely, in the manufacturing apparatus 10, as shown in FIG. 4, the first tape roll 17 and the second tape roll 18 are disposed at positions bilaterally symmetric with respect to the pair of the heating rolls 16.

Moreover, in the manufacturing apparatus 10, the first sticking machine 23 is disposed between the first tape roll 17 and the pair of heating rolls 16, and the second sticking machine 24 is disposed between the second tape roll 8 and the pair of heating rolls 16. The first sticking machine 23 and the second sticking machine 24 are adapted so that they are disposed at positions equal in distance from the pair of heating rolls 16, and their timings for sticking first peeling sheets 12 and second peeling sheets 14 are synchronized with each other.

Further, in the manufacturing apparatus 10, there is provided press cutter (not shown) for respectively forming cut portions along external shapes of the first peeling sheet 12 and the second peeling sheet 14 with respect to the first insulating tape 13 on which the first peeling sheets 12 are stuck and the second insulating tape 15 on which the second peeling sheets 14 are stuck.

In this manufacturing apparatus 10, dancer rolls 25 are respectively disposed on travelling paths of the first and second insulating tapes 13 and 15, and the first and second insulating tapes 13 and 15 are laid over these dancer rolls 25. These dancer rolls 25 exhibit substantially columnar shape, wherein they have widths caused to be slightly greater than widths of the first insulating tape 13 and the second insulating tape 15, and apply predetermined tensions to the first insulating tape 13 and the second insulating tape 15. In more practical sense, these dancer rolls 25 are caused to have a predetermined weight and are disposed in the state weighted in a vertical direction. For this reason, the dancer rolls 25 thrust or force the first insulating tape 13 and the second insulating tape 15 in a vertical direction to apply predetermined tensions thereto.

Thus, in the manufacturing apparatus 10, it can be prevented that the first and second insulating tapes 13, 15 which are travelling are loosened. It is to be noted that, in the manufacturing apparatus, there may be employed the configuration in which dancer rolls 25 are provided similarly with respect to the conductive wires 11.

Moreover, the manufacturing apparatus 10 comprises a first sensor 26 for detecting first peeling sheet 12 stuck on the first insulating tape 13, a second sensor 27 for detecting second peeling sheet 14 stuck on the second insulating tape 15, and control unit (not shown) for controlling first brake unit 21 and second brake unit 22.

These first and second sensors 26 and 27 are disposed so that they are positioned at succeeding stage of travelling direction of the first insulating tape 13 and the second insulating tape 15 with respect to the pair of heating rolls 16 and they are opposite to each other. The first and second sensors 26 and 27 are not particularly limited to transmission type sensor, reflection type sensor, or camera, etc.

On the other hand, the control unit is of configuration in which it is supplied with signals from the first sensor 26 and the second sensor 27 and it controls the first and second brake units 21 and 22 on the basis of control signal generated by the above-mentioned signal.

In the manufacturing apparatus 10, there are provided a pair of drive rollers (not shown) positioned at the succeeding stage of travelling direction of the conductive wires 11 and the first and second insulating tapes 13 and 15 with respect to the first and second sensors 26 and 27. In the manufacturing apparatus 10, these pair of drive rollers are driven so that the conductive wires 11, the first insulating tape 13 and the second insulating tape 15 are drawn into the portion between a pair of heating rolls 16.

In the manufacturing apparatus 10 constituted as described above, first and second insulating tapes 13 and 15 are respectively first supplied from the first and second tape rolls 17 and 18, and are sent to a pair of heating rolls 16 side. Thus, before the first and second insulating tapes 13 and 15 are sent into the portion between a pair of heating rolls 16, first peeling sheets 12 are continuously stuck with a predetermined sticking interval C onto adhesive layers of the first insulating tape 13 and second peeling sheets 14 are continuously stuck with a predetermined sticking interval D onto adhesive layers of the second insulating tape 15.

At this time, the first and second peeling sheets 12 and 14 are stuck in a manner respectively perpendicular to the length direction of the first and second insulating tapes 13 and 15, and are stuck in such a manner that portions are protruded or projected from one end in the width direction of the first and second insulating tapes 13 and 15. In addition, there are respectively formed cut portions along the outer shapes of the first and second peeling sheets 12 and 14 by press cutter (not shown) at the first and second insulating tapes 13 and 15.

Then, the first insulating tape 13 on which the first peeling sheets 12 are stuck and the second insulating tape 15 on which second peeling sheets 14 are stuck are drawn into the portion between a pair of heating rolls 16 in the state where plural conductive wires 11 are put therebetween. At this time, as the result of the fact that the first and second insulating tapes 13 and 15 are heated and pressure-fitted by a pair of heating rolls 16, the first insulating tape 13, the conductive wires 11 and the second insulating tape 15 are stuck in order recited. In addition, the first peeling sheet 12 and the second peling sheet 14 are opposed to each other through conductive wires 11.

Then, the first and second insulating tapes 13 and 15 stuck through the conductive wires 11 are passed through the portion between the first and second sensors 26 and 27. At this time, the first sensor 26 detects the position of the first peeling sheet 12 stuck on the first insulating tape 13 and the second sensor 27 detects the position of the second peeling sheet 14 stuck on the second insulating tape 15. Further, position of the first peeling sheet 12 and position of the second peeling sheet 14 that the first and second sensors 26 and 27 have respectively detected are sent to the control unit as detection signals.

At the control unit, sticking errors of the first and second peeling sheets are calculated on the basis of detection signals delivered from the first and second sensors 26 and 27. In the case where sticking error takes place, a control signal is sent from the control unit to control the first or second brake unit 21 or 22.

In more practical sense, the control unit calculates sticking interval $C_1$ of the first peeling sheets 12 on the first insulating tape 13, and calculates sticking interval $D_1$ of the second peeling sheets 14 on the second insulating tape 15. Further, the control unit controls the first and second brake units 21 and 22 on the basis of the calculation results, thereby allowing sticking interval C of the first peeling sheets 12 and sticking interval D of the second peeling sheets 14 to be desired lengths, respectively.

In this case; the first and second brake units 21 and 22 are adapted so that when their braking forces are strengthened (enhanced) by control signal from the control unit, they strengthen (enhance) tension applied to the first and second insulating tapes 13 and 15. Thus, when tensions applied to the first and second insulating tapes 13 and 15 are strengthened, the first and second insulating tapes 13 and 15 are expanded. Accordingly, by strengthening (enhancing) braking forces of these first and second brake units 21 and 22, sticking interval C and sticking interval D can be enlarged.

On the contrary, the first and second brake units 21 and 22 are adapted so that when their braking forces are weakened by control signal from the control unit, they weaken tensions applied to the first and second insulating tapes 13 and 15. Thus, when tensions applied to the first and second insulating tapes 13 and 15 are weakened, these first and second insulating tapes 13 and 15 are contracted. Accordingly, by weakening braking forces of these first and second brake units 21 and 22, sticking interval C and sticking interval D can be reduced.

As stated above, such an approach is employed to respectively independently control relative expansions/contractions of the first and second insulating tapes 13 and 15, thereby permitting sticking interval C of the first peeling sheets 12 and sticking interval D of the second peeling sheets 14 to be desired lengths, respectively. Further, in this manufacturing apparatus 10, there can be carried out such a feedback control to adjust sticking interval C and sticking interval D on the basis of detection signals from the first and second sensors 26 and 27.

Figure 6:
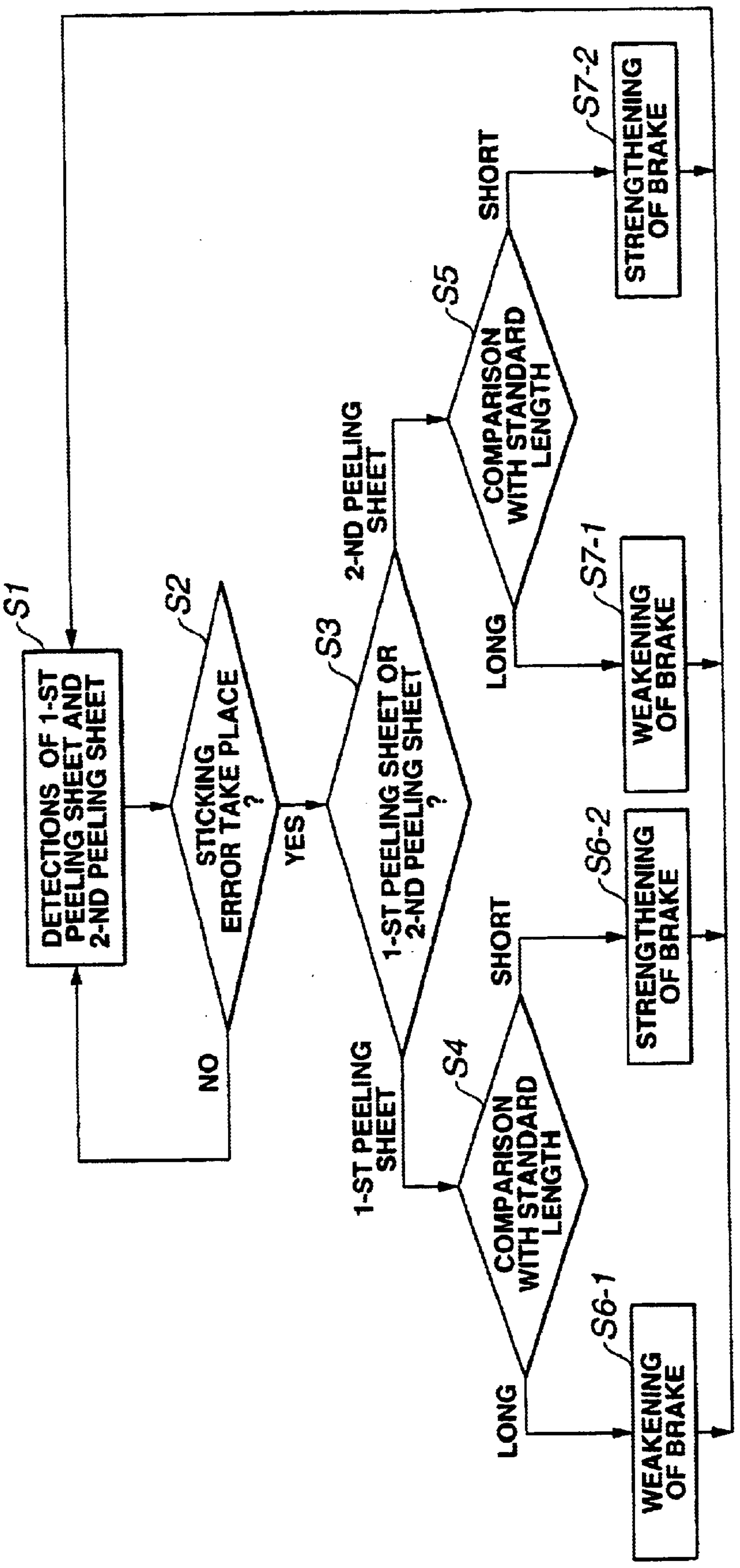
FIG. 6 is a flowchart for explaining feedback control.

A more practical flowchart of such a feedback control is shown in FIG. 6.

In carrying out such feedback control, at step S1, positions of the first and second peeling sheets 12 and 14 are first detected. The processing proceeds to step S2.

At the step S2, positional shift between the first and second peeling sheets 12 and 14 is discriminated on the basis of the detection results at the step S1. Namely, in the case where sticking error takes place between the first peeling sheet 12 and the second peeling sheet 14, the processing proceeds to step S3. On the other hand, in the case where the first peeling sheet 12 and the second peeling sheet 14 are precisely opposite to each other, the processing returns to the step S1. Thus, the processing are repeated for a second time.

At the step S3, a procedure is taken to calculate sticking interval $C_1$ of the first peeling sheets 12 and sticking interval $D_1$ of the second peeling sheets 14 to compare them with standard length to thereby discriminate any one of which sticking interval $C_1$ and sticking interval $D_1$ is different from the standard length. As the result of discrimination, in the case where the first peling sheet 12 is positionally shifted with respect to the standard length, the processing proceeds to step S4. In the case where the second peeling sheet 14 is positionally shifted with respect to the standard length, the processing proceeds to step S5.

At the step S4, whether the sticking interval $C_1$ of the first peeling sheet 12 is longer or shorter than the standard length is discriminated. In the case where the sticking interval $C_1$ is long with respect to the standard length, the processing proceeds to step S6-1. On the other hand, in the case where the sticking interval $C_1$ is short with respect to the standard length, the processing proceeds to step S6-2.

At the step S6-1, the first brake unit 21 is controlled to weaken braking force. Thus, a correction is made such that expansion of the first insulating tape 13 is reduced and the sticking interval C of the first peeling sheet 12 is shortened. Further, the processing returns to the step S1 to repeat processing for a second time.

At the step S6-2, the first brake unit 21 is controlled to strengthen or enhance braking force. Thus, a correction is made such that expansion of the first insulating tape 13 is enlarged and sticking interval C of the first peeling sheet 12 is elongated. Further, the processing returns to the step S1 to repeat the processing for a second time.

On the other hand, at step S5, whether the sticking interval $D_1$ of the second peeling sheet 14 is long or short with respect to the standard length is discriminated. In the case where the sticking interval $D_1$ is long with respect to the standard length, the processing proceeds to step S7-1. In the case where sticking interval $D_1$ is short with respect to the standard length, the processing proceeds to step S7-2.

At the step S7-1, the second brake unit 22 is controlled to weaken braking force. Thus, a correction is made such that expansion of the second insulating tape 15 is reduced and the sticking interval D of the second peeling sheets 14 is shortened. Further, the processing returns to the step S1 to repeat the processing for a second time.

At the step S7-2, the second brake unit 22 is controlled to strengthen or enhance braking force. Thus, a correction is made such that expansion of the second insulating tape 15 is enlarged and the sticking distance D of the second peeling sheets 14 is elongated. Further, the processing returns to the step S1 to repeat the processing for a second time.

As stated above, in the manufacturing apparatus 10, by repeating processing in accordance with such a feedback control, correction can be made such that sticking interval C of the first peeling sheets 12 and sticking interval D of the second peeling sheets 14 are allowed to be respectively desired lengths. Accordingly, in this manufacturing apparatus 10, it is possible to precisely oppose the first peeling sheet 12 and the second peeling sheet 14.

Then, the first peeling sheet 12 and the second peeling sheet 14 are peeled off from the first insulating tape 13 and the second insulating tape 15 which have been stuck through the conductive wires 11. In this example, at the first and second insulating tapes 13 and 15, there are respectively formed cut portions along outer shapes of the first and second peeling sheets 12 and 14. Thus, it is possible to easily peel off portions of the first and second insulating tapes 13 and 15 along with the first and second peeling sheets 12 and 14.

Accordingly, it is possible to expose conductive wires 11 at equal intervals from the both surfaces of the first and second insulating tapes 13 and 15. Further, by cutting conductive wires 11 exposed from the both surfaces of the first and second insulating tapes 13 and 15 to allow them to have a predetermined length, it is possible to manufacture flat cable in which conductive wires 11 are exposed from the both end portions in its length direction.

As stated above, in the manufacturing apparatus 10, the first brake unit 21 and the second brake unit 22 respectively adjust tensions of the first insulating tape 13 and the second insulating tape 15, thereby making it possible to respectively independently change expansions/contractions of the first and second insulating tapes 13 and 15. In addition, in this manufacturing apaparatus 10, it is possible to carry out feedback control of sticking interval C of the first peeling sheets 12 and sticking interval D of the second peeling sheets 14.

For this reason, in the manufacturing apparatus 10, it is possible to precisely oppose the first peeling sheet 12 and the second peeling sheet 14. Thus, it is possible to prevent positional shift of conductive wires 11 exposed from the both surfaces of the first insulating tape 13 and the second insulating tape 15. In other words, at the portions from which conductive wires 11 are exposed of the flat cable, end surface of the first insulating tape 13 and end surface of the second insulating tape 15 are permitted to be flush with each other.

In addition, in the manufacturing apparatus 10, since such a feedback control is carried out, it is unnecessary for correcting sticking error between the first peeling sheet 12 and the second peeling sheet 14 to once stop the apparatus to adjust it.

Accordingly, in this manufacturing apparatus 10, it is possible to greatly improve productivity of flat cables. Thus, high quality flat cables in which product yield has been improved can be manufactured.

It is to be noted that, in the manufacturing apparatus 10, as shown in FIG. 4, there is employed the configuration in which first tape roll 17 and second tape roll 18 are arranged in horizontal direction with respect to vertical direction, and dancer rolls 25 are respectively disposed on travelling paths of the first and second insulating tapes 13 and 15. However, the manufacturing apparatus for flat cable to which this invention is applied is not limited to such a configuration. For example, there may be employed a configuration such that first tape roll 17 and second tape roll 18 are arranged in vertical direction through conductive wires 11 as shown in FIG. 7.

In this case, it is unnecessary to dispose dancer rolls 25 for carrying out weighting in vertical direction, thus permitting the entirety of the apparatus to become more compact.

Figure 7:
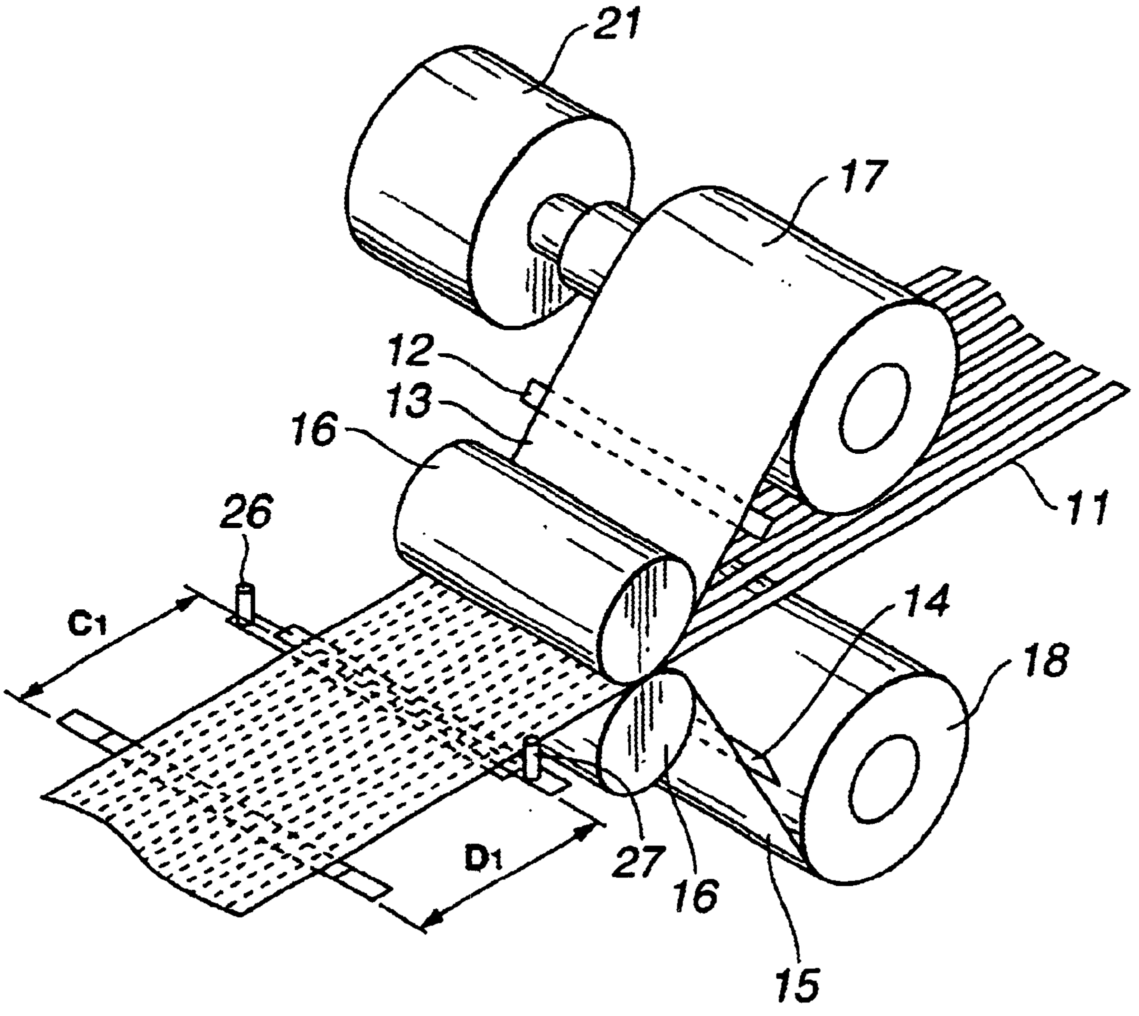
FIG. 7 is a schematic perspective view showing another example of the configuration of the manufacturing apparatus for flat cable to which this invention is applied.

Moreover, as in the manufacturing apparatus shown in FIG. 7, there may be employed a configuration using first tape roll 17 where there is wound first insulating tape 13 on which first peeling sheets 12 are stuck at predetermined intervals and second tape roll 18 where there is wound second insulating tape 15 on which second peeling sheets 14 are stuck at predetermined intervals.

In this case, it is unnecessary to provide the above-described first and second sticking machines 23 and 24. Thus, the entirety of the apparatus can become more compact.

In addition, in the manufacturing apparatus 10, there is employed the configuration in which the first and second peeling sheets 12 and 14 are stuck with respect to the first and second insulating tapes 13 and 15 in the state where such peeling sheets are opposite to each other. However, the manufacturing apparatus for flat cable to which this invention is applied is not limited to such a configuration. For example, there may be employed a configuration such that the first and second peeling sheets 12 and 14 are stuck in the state positionally shifted to each other at a predetermined interval.

Figure 8:
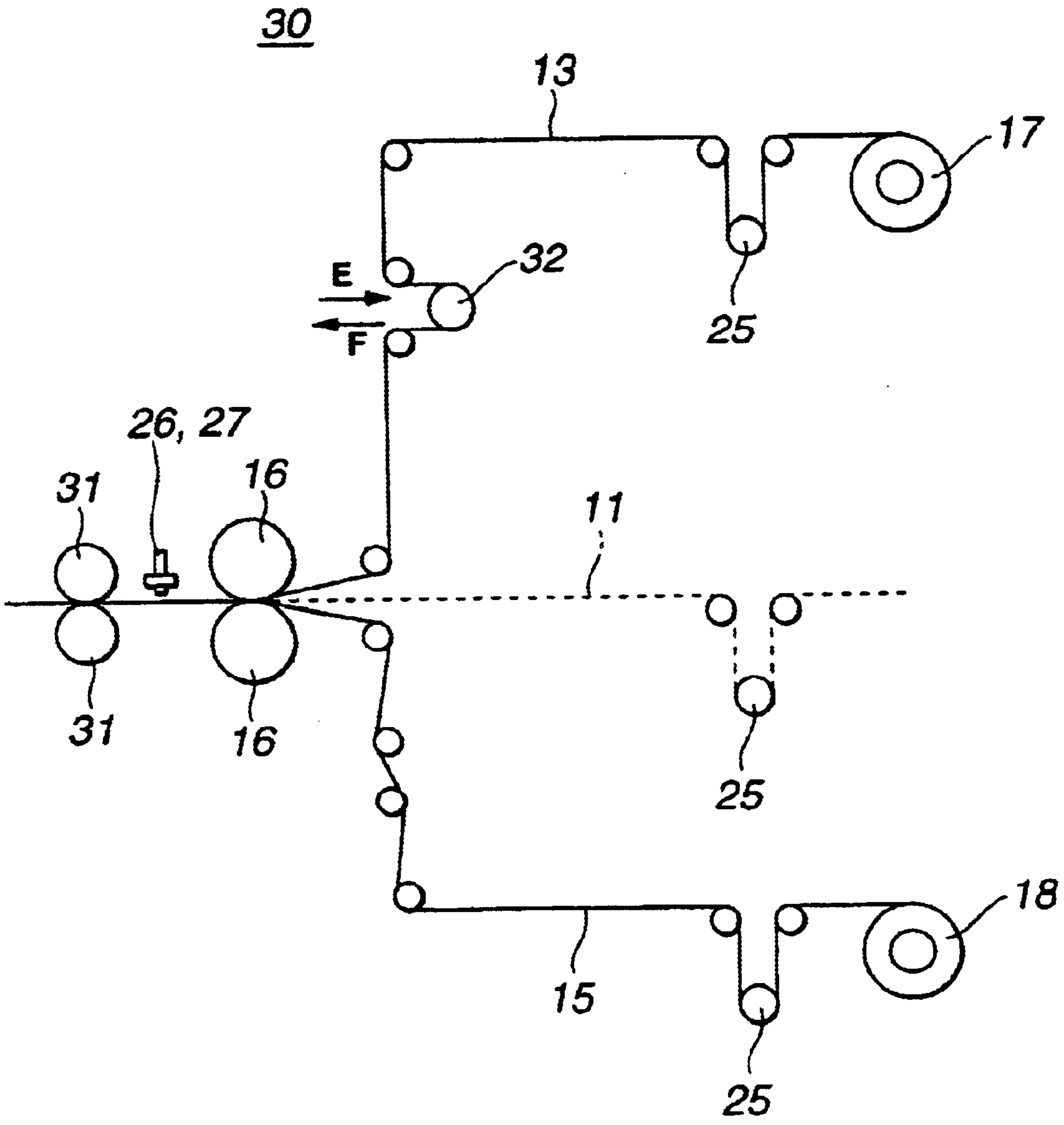
FIG. 8 is a schematic view for explaining the configuration of another manufacturing apparatus for flat cable to which this invention is applied.

Another manufacturing apparatus for flat cable to which this invention is applied is shown in FIG. 8. It is to be noted that, in FIG. 8, explanation will be omitted with respect to portions equivalent to the above-described manufacturing apparatus 10, and the same reference numerals are respectively attached thereto.

The manufacturing apparatus 30 shown in FIG. 8 is directed to a manufacturing apparatus for flat cable in which first peeling sheets 12 and second peeling sheets 14 are respectively stuck onto first insulating tape 13 and second insulating tape 15 in the state where such peeling sheets are positionally shifted to each other at a predetermined interval.

This manufacturing apparatus 30 comprises feed reel (not shown) for delivering plural conductive wires 11, a first tape roll 17 and a second tape roll 18 for respectively delivering first insulating tape 13 and second insulating tape 15, a pair of heating rolls 16 for allowing plural conductive wires 11 to be put therebetween along with first insulating tape 13 and second insulating tape 15, and a pair of drive rollers 31 for drawing thereinto these conductive wires 11 and the first and the second insulating tapes 13 and 15.

Moreover, in this manufacturing apparatus 30, dancer rolls 25 are respectively disposed on travelling paths of the conductive wires 11, and the first and second insulating tapes 13 and 15, and the conductive wires 11, and the first and second insulating tapes 13 and 15 are laid over these dancer rolls 25. In addition, this manufacturing apparatus 30 comprises first sticking machine, second sticking machine and press cutter which are not shown.

Further, in this manufacturing apparatus 30, in place of the above-described first and second brake units 21 and 22, a brake roll 32 for applying a predetermined tension to the first insulating tape 13 is disposed on travelling path of the first insulating tape 13, and is laid over the first insulating tape 13. This brake roll 32 can be moved in a direction substantially perpendicular to the direction in which tension is applied to the first insulating tape 13.

In addition, this manufacturing apparatus 30 comprises control unit (not shown) for calculating sticking errors of the first and second peeling sheets 12 and 14 and for controlling the brake roll 32.

Figure 9:
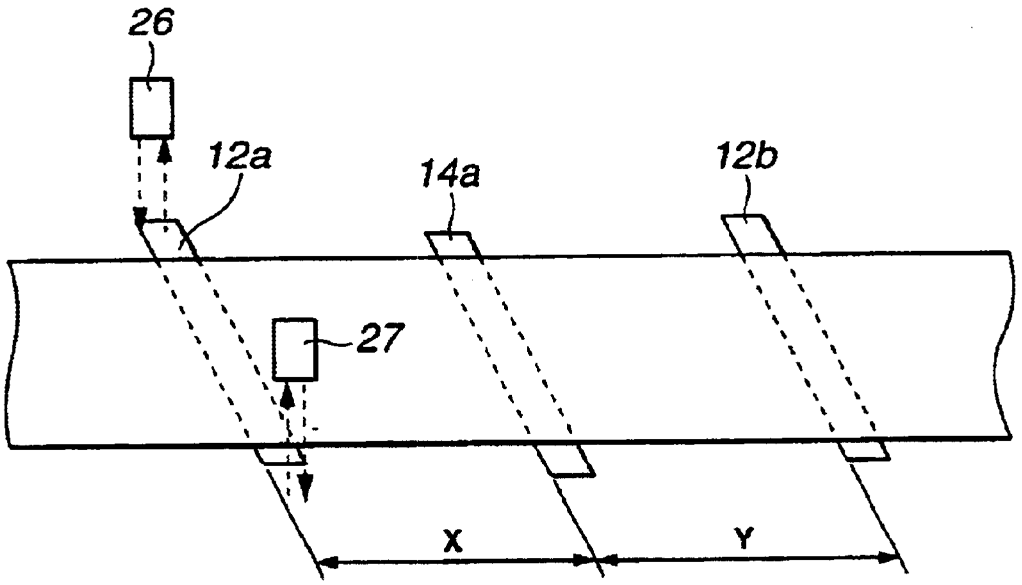
FIG. 9 is a view showing the state where first peeling sheet and second peeling sheet are stuck in the state positionally shifted at a predetermined interval.

In the manufacturing apparatus 30 thus constituted, as shown in FIG. 9, the first sensor 26 and the second sensor 27 respectively detect positions of the first peeling sheet 12 and the second peeling sheet 14. Further, position of the first peeling sheet 12 and position of the second peeling sheet 14 that the first sensor 26 and the second sensor 27 have detected are respectively sent out to the control unit as detection signals.

In the control unit, there are calculated sticking errors of the first peeling sheet 12 and the second peeling sheet 14 on the basis of detection signals received from the first sensor 26 and the second sensor 27. Further, in the case where any sticking error takes place, control signal is sent from the control unit to control the brake roll 32.

In this case, as shown in FIG. 9, output from the control unit to the brake roll 32 is expressed as follows.

$$\text{Output}=(Y-(X+Y)/2)\times K$$

In the above-mentioned formula, X indicates sticking interval between the first peeling sheet 12*a* and the second peeling sheet 14*a*, Y indicates sticking interval between the second peeling sheet 14*a* and the next peeling sheet 12*b*, and K indicates coefficient corresponding to material used in the first and second insulating tapes 13 and 15.

The brake roll 32 moves in a direction substantially perpendicular to the direction in which tension is applied to the first insulating tape 13 in accordance with an output from this control unit. Thus, the brake roll 32 can adjust tension applied to the first insulating tape 13 and can change expansion/contraction of the first insulating tape 13.

In more practical sense, in the case where sticking interval between the first peeling sheet 12 and the second peeling sheet 14 is short, the brake roll 32 moves in a direction away from the first insulating tape 13 indicated by arrow E in FIG. 8 to thereby strengthen or enhance tension applied to the first insulating tape 13. Further, when tension applied to the first insulating tape 13 is strengthened, this first insulating tape 13 is expanded. Thus, sticking interval between the first and second peeling sheets 12 and 14 can be enlarged.

On the contrary, in the case where sticking interval between the first and second peeling sheets 12 and 14 is long, the brake roll 32 moves in a direction close to the first insulating tape 13 indicated by arrow F in FIG. 8 to thereby weaken tension applied to the first insulating tape 13. Further, when the tension applied to the first insulating tape 13 is weakened, this first insulating tape 13 is contracted. Thus, sticking interval between the first peeling sheet 12 and the second peeling sheet 14 can be reduced.

As stated above, in the manufacturing apparatus 30, by controlling the brake roll 32, sticking interval between the first peeling sheet 12 and the second peeling sheet 14 is permitted to be desired length. Further, in this manufacturing apparatus 30, it is possible to carry out such a feedback control to adjust sticking interval between the first peeling sheet 12 and the second peeling sheet 14 on the basis of detection signals from the first sensor and the second sensor 26 and 27.

The manufacturing apparatus 30 repeats the processing in accordance with such a feedback control, thereby making it possible to make a correction such that sticking interval between the first and second peeling sheets 12 and 14 is caused to be desired length. Accordingly, in this manufacturing apparatus 30, it is possible to precisely stick the first peeling sheet 12 and the second peeling sheet 14 in the state positionally shifted at a predetermined interval.

Then, the first peeling sheet 12 and the second peeling sheet 14 are peeled off from the first insulating tape 13 and the second insulating tape 15 which have been stuck through the conductive wires 11. Thus, there is manufactured a flat cable in which conductive wires 11 are alternately exposed at predetermined intervals from both surfaces of the first insulating tape 13 and the second insulating tape 15.

As stated above, in the manufacturing apparatus 30, the brake roll 32 respectively adjusts tension of the first insulating tape 13, thereby making it possible to change expansion/contraction of the first insulating tape 13. Further, in this manufacturing apparatus 30, it is possible to carry out feedback control of sticking interval of the first peeling sheets 12 and sticking interval of the second peeling sheets 14.

For this reason, in the manufacturing apparatus 30, it is possible to precisely stick the first peeling sheet 12 and the second peeling sheet 14 in the state positionally shifted as a predetermined intervals. Thus, it is possible to manufacture flat cable in which conductive wires 11 are alternately exposed precisely at predetermined intervals from both surfaces of the first insulating tape 13 and the second insulating tape 15.

In addition, in the manufacturing apparatus 30, since such a feedback control is carried out, it is unnecessary for correcting sticking error between the first peeling sheet 12 and the second peeling sheet 14 to once stop the apparatus to adjust it. Accordingly, this manufacturing apparatus 30 can greatly improve productivity of flat cables. Thus, high quality flat cables in which product yield has been improved can be manufactured.

INDUSTRIAL APPLICABILITY

In the manufacturing apparatus for flat cable according to this invention, since the first tension applying means and the second tension applying means respectively adjust tensions of the first and second insulating tapes, it is possible to respectively independently change expansions/contractions of the first and second insulating tapes. Further, the control means controls the first tension applying means and the second tension applying means on the basis of sticking errors of the first peeling sheets and the second peeling sheets which are detected by the detecting means, thereby making it possible to carry out feedback control of sticking intervals of the first peeling sheets and the second peeling sheets.

Accordingly, in accordance with this manufacturing apparatus, it is unnecessary for correcting sticking error between first peeling sheet and second peeling sheet to once stop the apparatus to adjust it. As a result, productivity of flat cable can be greatly improved. Thus, high quality flat cables in which product yield has been improved can be manufactured.

Further, in the manufacturing method for flat cable according to this invention, a procedure is taken to respectively adjust tensions applied to the first and second insulating tapes, thereby making it possible to respectively independently change expansions/contractions of the first and second insulating tapes. A further procedure is taken to respectively adjust tensions applied to the first and second insulating tapes on the basis of detected sticking errors of the first and second peeling sheets, thereby making it possible to correct sticking errors of the first and second peeling sheets.

Accordingly, in accordance with this technique, since first peeling sheets and second peeling sheets are respectively precisely stuck (attached) at predetermined intervals onto the first insulating tape and the second insulating tape, productivity of flat cable can be greatly improved. Thus, high quality flat cable in which product yield has been improved can be manufactured.

What is claimed is:

1. An apparatus for manufacturing flat cable in which plural conductive wires arranged on the same plane are put between a first insulating tape on which first peeling sheets are stuck at predetermined intervals and a second insulating tape on which second peeling sheets are stuck at predetermined intervals to stick the first insulating tape, the conductive wires and the second insulating tape in order recited, the apparatus comprising:

first tension applying means and second tension applying means for respectively applying predetermined tensions to the first insulating tape and the second insulating tape;

detecting means for allowing the conductive wires to be put between the first insulating tape and the second insulating tape thereafter to detect passing of the first peeling sheet and the second peeling sheet; and control means for calculating sticking errors of the first peeling sheets and the second peeling sheets on the basis of detection results that the detecting means have detected, and for controlling the first tension applying means and second tension applying means on the basis of these sticking errors, wherein the control means controls the first tension applying means and the second tension applying means to thereby respectively adjust tensions of the first insulating tape and the second insulating tape.

2. The apparatus for manufacturing flat cable as set forth in claim 1, wherein the first insulating tape and the second insulating tape are respectively wound on tape rolls, and wherein the first tension applying means and the second tension applying means are rotational control means for controlling rotational drive of the tape rolls.

3. The apparatus for manufacturing flat cable as set forth in claim 1, wherein the first tension applying means and the second tension applying means are brake rolls disposed on travelling paths of the first insulating tape and the second insulating tape.

4. The apparatus for manufacturing flat cable as set forth in claim 1, wherein the first insulating tape and the second insulating tape are stuck through the conductive wires in such a manner to oppose the first peeling sheet and the second peeling sheet.

5. The apparatus for manufacturing flat cable as set forth in claim 1, wherein the first insulating tape and the second insulating tape are stuck through the conductive wires in such a manner that the first peeling sheets and the second peeling sheets are positionally shifted at predetermined intervals.

6. The apparatus for manufacturing flat cable as set forth in claim 1, which includes dancer rolls for respectively applying predetermined tensions to the first insulating tape and the second insulating tape.

7. A method for manufacturing flat cable in which plural conductive wires arranged on the same plane are put between a first insulating tape on which first peeling sheets are stuck at predetermined intervals and a second insulating tape on which second peeling sheets are stuck at predetermined intervals to stick the first insulating tape, the conductive wires and the second insulating tape in order recited, the method comprising the steps of:

allowing the conductive wires to be put between the first insulating tape and the second insulating tape thereafter to detect passing of the first peeling sheet and the second peeling sheet;

calculating sticking errors of the first peeling sheets and the second peeling sheets on the basis of the detection results; and respectively adjusting tensions applied to the first insulating tape and the second insulating tape on the basis of the sticking errors.

8. The method for manufacturing flat cable as set forth in claim 7, wherein the first insulating tape and the second insulating tape are stuck through the conductive wires so as to oppose the first peeling sheet and the second peeling sheet.

9. The method for manufacturing flat cable as set forth in claim 7, wherein the first insulating tape and the second insulating tape are stuck through the conductive wires in such a manner that the first peeling sheet and the second peeling sheet are positionally shifted at predetermined intervals.

* * * * *